Nov. 17, 1925.

H. O. NINE ET AL 1,561,563

SNUBBER

Filed June 6, 1925

2 Sheets-Sheet 1

Inventors
H. O. Nine and
R. A. Knight
By Freast and Bond Attorneys

Nov. 17, 1925.

H. O. NINE ET AL 1,561,563

SNUBBER

Filed June 6, 1925    2 Sheets-Sheet 2

Inventors
H. O. Nine and
R. A. Knight
By Frease and Bond
Attorneys

Patented Nov. 17, 1925.

1,561,563

UNITED STATES PATENT OFFICE.

HARRY O. NINE AND RAYMOND A. KNIGHT, OF CANTON, OHIO.

SNUBBER.

Application filed June 6, 1925. Serial No. 35,343.

*To all whom it may concern:*

Be it known that we, HARRY O. NINE and RAYMOND A. KNIGHT, citizens of the United States, residing at Canton, in the county of Stark and State of Ohio, have invented certain new and useful Improvements in Snubbers, of which the following is a specification.

This invention relates to snubbers or rebound controllers adapted to be connected between the body and axle or running gear of an automobile to check rebound movements of the body following the sudden compression of the springs of the automobile.

Rebound controls or snubbers of this general type which are at present in common use comprises a friction drum upon which a flexible member is spirally wound, the free end of the flexible member being connected to the axle or running gear while the casing in which the drum is mounted is connected to the body of the automobile, a spiral spring being provided for permitting the flexible member to uncoil from the drum under tension and to return the flexible member to the normal position as the spring of the automobile is flexed.

In snubbers of this general type as now in general use frequent difficulty is experienced through the refusal of the friction drum to rotate properly to permit the flexible member to be uncoiled and to return the same properly to the normal position.

The object of the present improvement is to overcome these difficulties by providing a snubber mounted within a grease tight casing adapted to be filled with lubricating grease, the friction drum of the snubber being perforated to permit a free passage of grease therethrough, whereby all the parts are properly lubricated and free working thereof is insured.

Figure 1:
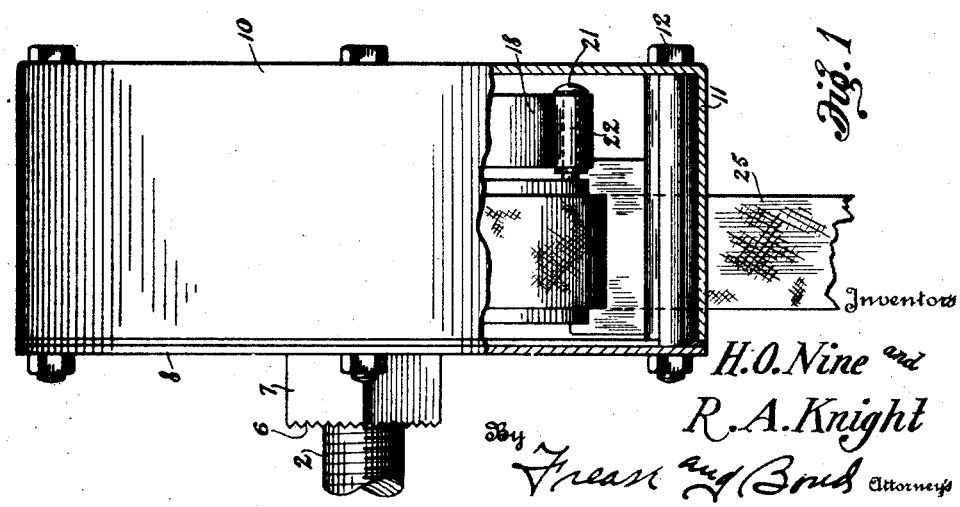
Figure 3:
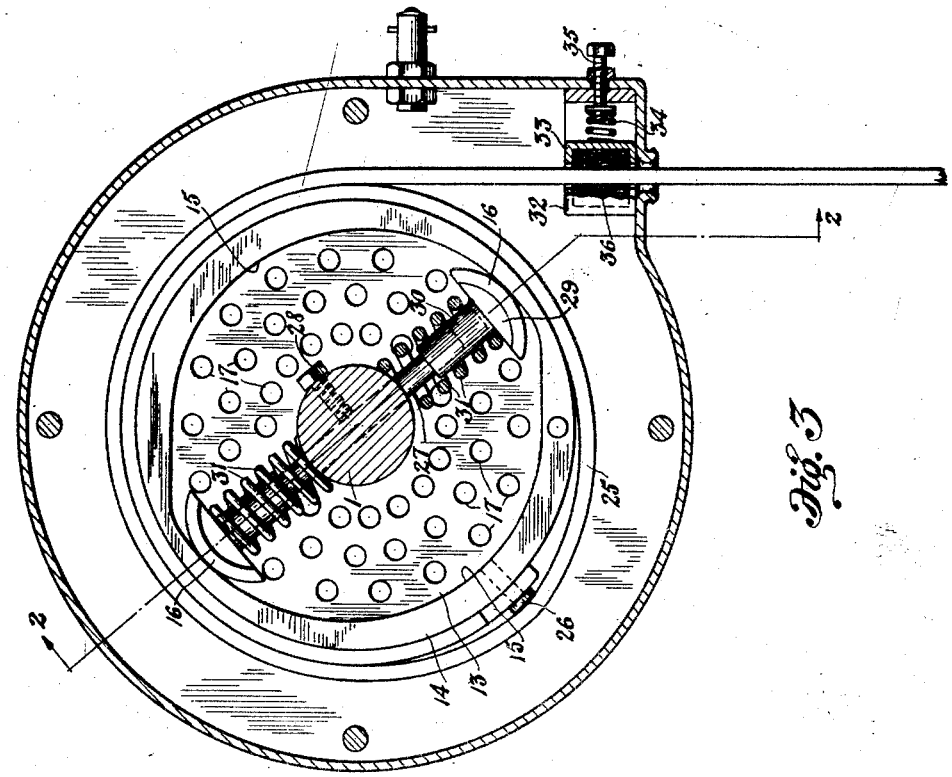
Figure 2:
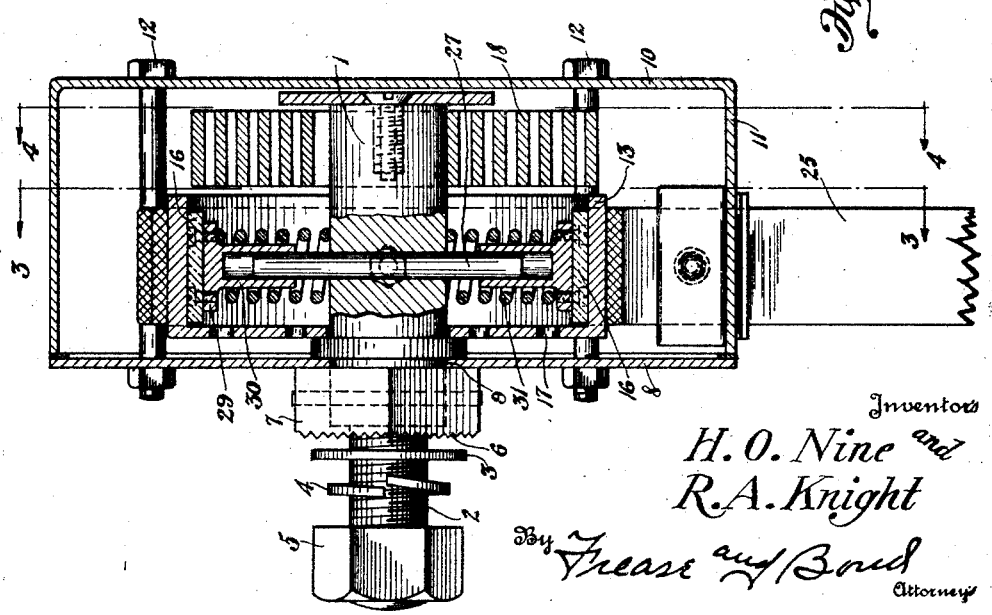

An embodiment of the invention is illustrated in the accompanying drawings, in which:

Figure 1 is an edge elevation partly in section, of a snubber embodying the invention;

Fig. 2, an enlarged transverse section on line 2—2, Fig. 3;

Fig. 3, a section on the line 3—3, Fig. 2; and

Figure 4:
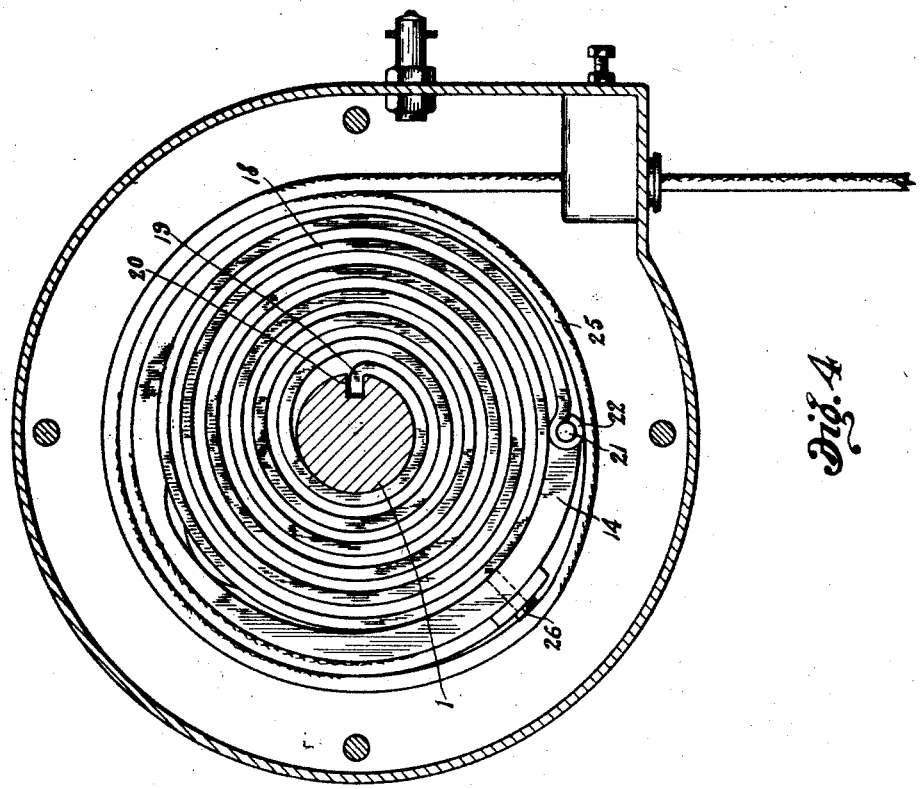

Fig. 4, a section on the line 4—4, Fig. 2.

Similar numerals of reference indicate corresponding parts throughout the several figures of the drawings.

A center stud 1 is provided with a screw threaded shank 2, which may be formed integral therewith or otherwise attached and provided with the slidable collar 3, lock washer 4 and nut 5 for securing the snubber to the chassis or other part of the automobile body, which is clamped between the slidable collar 3 and the serrated face 6 of the enlarged square portion 7 of the center stud.

The case within which the working parts of the snubber are enclosed comprises the back member 8, having a central opening 9 to receive the center stud, and the front member 10 provided with the flange 11 held in contact with the back member as by the tie bolts 12.

The friction drum 13 is rotatably mounted upon the central portion of the stud and provided with the annular flange 14 having the double cam face 15 for frictional engagement with the friction shoes 16 as will be later described.

The casing is adapted to be filled with lubricating grease as will be hereinafter described and a plurality of transverse perforations 17 may be provided through the friction drum to permit free passage of the lubricating grease therethrough.

The stiff coil spring 18, which may be formed from a flat bar as shown, encircles the center stud, the inner end of the spring being bent inward as shown at 19 and received in the groove 20 of the stud.

A stud 21, is carried by the flange portion of the friction drum and engages the eye 22, formed at the outer end of the spring 18.

Surrounding the friction drum and wrapped spirally around the same one or more times is a flexible member, preferably in the form of a belt 25, whose inner end is connected to the drum as by the stud 26, and whose outer end is arranged to be connected in any well known manner to the axle or any suitable part of the running gear of the automobile.

A rod 27 is located transversely through the center stud, within the friction drum, and connected to said stud as by the set screw 28, engaging the middle portion of the rod, the ends of the rod thus forming two radial arms upon the center stud.

Each friction shoe 16, is of fibre or other suitable friction material, and is carried upon the head 29, of a sleeve 30, slidably mounted upon one of said radial arms, and normally urged outward by a coil spring 31 interposed between the center stud and the head.

As the automobile spring rebounds, the belt 25 will unwind from the drum, against the pull of the spiral spring, and the high portions of the cam surface 15 of the drum will engage the shoes 16, forcing said shoes inward upon the radial arms, against the pressure of the springs 31, and checking the rebound of the automobile spring.

The inside of the casing is filled with lubricating grease and for the purpose of preventing leakage of the same at the point where the belt passes out of the casing, a stuffing box is provided comprising a stationary portion 32 and an adjustable portion 33 normally held in position against the belt by means of a spring 34, tension upon which may be adjusted by the screw 35. Suitable packing, such as rubber and fabric 36, is carried in the opposed members of the stuffing box.

All working parts of the snubber are thus lubricated, preventing any binding or sticking of the parts and obviating the possibility of any unpleasant noises caused by the working of the parts. Since the friction drum 13 is perforated, the lubricating grease may pass freely through the perforations, permitting the drum to rotate properly as the spring of the automobile flexes and rebounds, causing the belt to be properly let out and rewound upon the drum.

We claim:—

1. A snubber for vehicles including a stationary stud, a drum rotatably mounted upon the stud and having an inner cam surface, friction shoes for engagement with said cam surface of the drum, a casing surrounding said drum and friction shoes, a spring for rotating the drum in one direction, a belt wound upon the drum for rotating the drum in the opposite direction, and means within the casing for continuously supplying lubricant to the friction surfaces of the drum.

2. A snubber for vehicles including a stationary stud, a drum rotatably mounted upon the stud and having an inner cam surface, friction shoes for engagement with the cam surface of said drum, a casing surrounding said drum and friction shoes, and arranged to be filled with lubricating grease, a spring for rotating the drum in one direction, a belt wound upon the drum for rotating the drum in the opposite direction, the free end of the belt extending through the casing and a stuffing box in the casing, through which the belt passes.

3. A snubber for vehicles, including a stationary stud, a drum rotatably mounted upon the stud and having an inner cam surface, friction shoes for engagement with the cam surface of said drum, a casing surrounding the drum and friction shoes and arranged to be filled with lubricating grease, the drum having perforations therein to convey lubricant to the friction faces of the drum and friction shoes, a spring for rotating the drum in one direction, and a belt wound upon the drum for rotating the drum in the opposite direction.

4. A snubber for vehicles including a stationary stud, a drum rotatably mounted upon the stud and having an inner cam surface, a radial arm upon the stud, a friction shoe slidably mounted upon the arm, a coil spring for urging the shoe against the cam surface of the drum, a spiral spring for rotating the drum in one direction, and a belt wound upon the drum for rotating the drum in the opposite direction.

In testimony that we claim the above, we have hereunto subscribed our names.

HARRY O. NINE.
RAYMOND A. KNIGHT.